United States Patent [19]

Jablonsky

[11] 4,237,993

[45] Dec. 9, 1980

[54] AUXILIARY POWER STEERING FOR MOTOR VEHICLES

[75] Inventor: Erich Jablonsky, Babingen, Fed. Rep. of Germany

[73] Assignee: Zahnradfabrik Friedrichshafen AG, Friedrichshafen, Fed. Rep. of Germany

[21] Appl. No.: 925,234

[22] Filed: Jul. 17, 1978

[30] Foreign Application Priority Data

Jul. 15, 1977 [DE] Fed. Rep. of Germany ....... 2731975

[51] Int. Cl.³ .................... B62D 5/06; F15B 20/00
[52] U.S. Cl. ...................................... 180/133; 60/405; 417/286
[58] Field of Search .................... 180/133; 60/405; 417/286

[56] References Cited

U.S. PATENT DOCUMENTS

| | | | |
|---|---|---|---|
| 3,407,894 | 10/1968 | Thompson | 60/405 X |
| 3,613,818 | 10/1971 | Schubert | 180/133 |
| 3,625,240 | 12/1971 | MacDuff | 180/133 |
| 3,747,725 | 7/1973 | Feustel | 60/405 X |
| 3,882,678 | 5/1975 | Fassbender | 60/405 |

FOREIGN PATENT DOCUMENTS

926831 5/1963 United Kingdom ............ 60/405

*Primary Examiner*—John P. Silverstrim
*Attorney, Agent, or Firm*—Zalkind & Shuster

[57] ABSTRACT

A transfer valve assembly controls the change-over in the supply of pressurized fluid to a steering servomotor from engine driven and vehicle driven pumps. The outflow rate of fluid from the engine driven pump is metered to control shift of the transfer valve assembly between its two operating positions preventing any delay or overlap in the change-over between pumps because of low or residual output pressure from the engine driven pump.

7 Claims, 7 Drawing Figures

AUXILIARY POWER STEERING FOR MOTOR VEHICLES

BACKGROUND OF THE INVENTION

This invention relates to improvements in power assist steering systems having primary and auxiliary fluid pressure supply pumps.

An auxiliary power steering system according to U.S. Pat. No. 3,747,725, is supplied with fluid through a pump transfer valve having a pressure face directly exposed to pressurized fluid from a primary or engine driven pump. An opposing spring-loaded pressure face of the valve assembly also has pressurized fluid applied thereto through an orifice assembly from the primary pump. The transfer valve has two stable positions and an unstable intermediate position. As long as the engine driven pump operates, it will supply a power steering unit with pressurized fluid while the emergency or auxiliary steering pump, driven by the vehicle is unloaded. The transfer valve in this operational mode is in one of its stable positions. In the event there is a drop in the flow rate of fluid delivered through the orifice assembly below a certain value, the transfer valve is displaced to the other stable position through the unstable intermediate position in which the emergency steering pump takes over so as to supply pressurized fluid to the power steering unit. In the intermediate position of the transfer valve, the engine driven pump is momentarily unloaded so that the separation of the two fluid circuits respectively associated with the two pumps is disturbed. Also, precisely timed pump change-over by the transfer valve for automatic fluid supply purposes is made difficult during partial failure of the engine driven pump because a residual pressure remains in the pump outlet line, the effect of which cannot be cancelled by the spring bias applied to the opposing pressure face of the transfer valve.

Other known prior art steering arrangements likewise operate with such a pressure dependent transfer valve assembly which may not change-over to reserve pump operation if a residual pressure output of the engine driven pump, of for example 10 BAR persists, since the bias of the spring acting on an opposing side of the transfer valve assembly is not sufficient to cause valve shift.

SUMMARY OF THE INVENTION

The present invention provides a transfer valve assembly wherein two fluid pump circuits formed by an engine dependent pump and an auxiliary or emergency vehicle driven steering pump are controlled with perfect hydraulic separation. The emergency steering pump in case of malfunction of the engine driven pump takes over with a high degree of reliability despite any remaining residual pressure output of the engine driven pump.

The transfer valve assembly of the present invention also meters the outflow of the engine driven pump so that the emergency steering pump is promptly enabled in response to a drop of the output flow rate of the engine driven pump below a certain value. Thus, any decrease in performance of the engine driven pump is operative by the action of pressure on a valve piston face of the transfer valve assembly to cause the emergency steering pump to take over the supply of fluid to the power steering unit. Accordingly, continued power assisted steering operation is assured despite development of any defect in the fluid circuit of the engine driven pump, such as a leak. The fluid supply to the power steering unit will remain intact despite such leakage.

BRIEF DESCRIPTION OF THE DRAWING FIGURES

Further details and advantages of the invention are explained in greater detail hereinafter on the basis of two embodiments as shown in the drawing wherein.

DETAILED DESCRIPTION OF PREFERRED EMBODIMENTS

Figure 1:
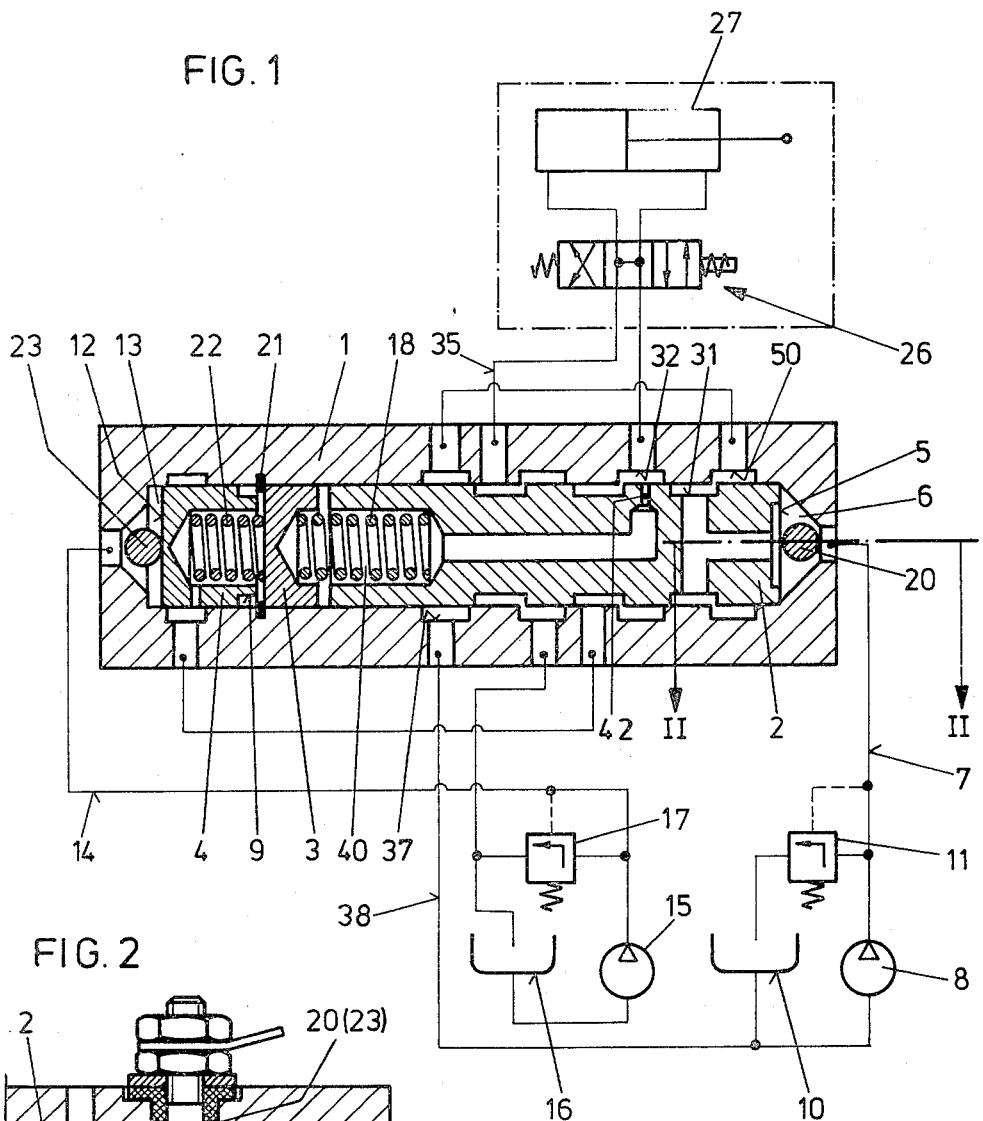
FIG. 1 is a section view of the transfer valve assembly of the present invention with associated fluid circuits including a power steering mechanism and pumps in an inactive state.
Figure 2:
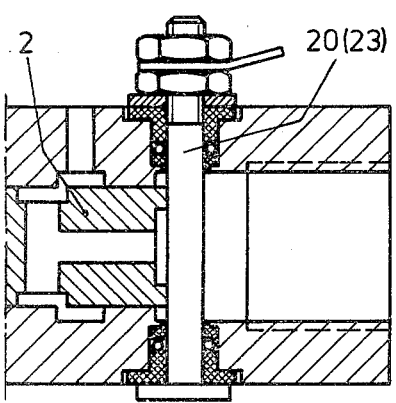
FIG. 2 is a partial section view taken substantially from the plane indicated by Section II—II in FIG. 1.

FIG. 1 illustrates a vehicle power assist steering system in accordance with the present invention in an inactive state with the vehicle engine shut down. A pump transfer valve assembly in its inactive position is shown in section including a control valve piston 2, a support piston 3 and a connecting valve 4 having a recessed extension 9 projecting toward the support piston 3. The three pistons are mounted in axial alignment and in series within a common bore of a valve body 1. A fluid pressure actuating face 5 of the control valve 2 is exposed to fluid pressure chamber 6 connected by pressure line 7 of a first fluid circuit formed by the vehicle engine driven pump 8, a fluid reservoir tank 10 and a relief jet valve 11. A fluid pressure actuating face 12 of the connecting valve 4 defines one axial end of a fluid pressure chamber 13 connected by line 14 to a second fluid circuit formed by an emergency steering pump 15, a fluid reservoir tank 16, and a relief jet valve 17. The two fluid circuits are limited to a maximum pressure by the two relief valves 11 and 17. A spring 18 is inserted between the control valve 2 and the support piston 3 to maintain the transfer valve assembly in the position shown in FIG. 1, wherein both pumps 8 and 15 are inactive. In this condition of the system, the control valve 2 abuts a contact pin 20 while the support piston 3 abuts a stop ring 21. Also, the connecting valve 4 under the bias of a spring 22 is held in abutment with the support piston 3 and also engages a contact pin 23. As a result of the contact of the two valves 2 and 4 with the contact pins 20 and 23, two electrical circuits are completed to illuminate a pair of indicators 24 and 25 signifying that the two pumps 8 and 15 are inactive, as will be described in detail hereinafter with reference to FIG. 5. A power steering mechanism of a generally known type is provided including a 4/3-way control valve 26 operated by rotary movement of a steering spindle (not shown) to conduct the supply of pressure fluid to a servomotor 27. While the vehicle is inactive, the control valve 26 will be in the neutral position shown in FIG. 1.

Figure 3:
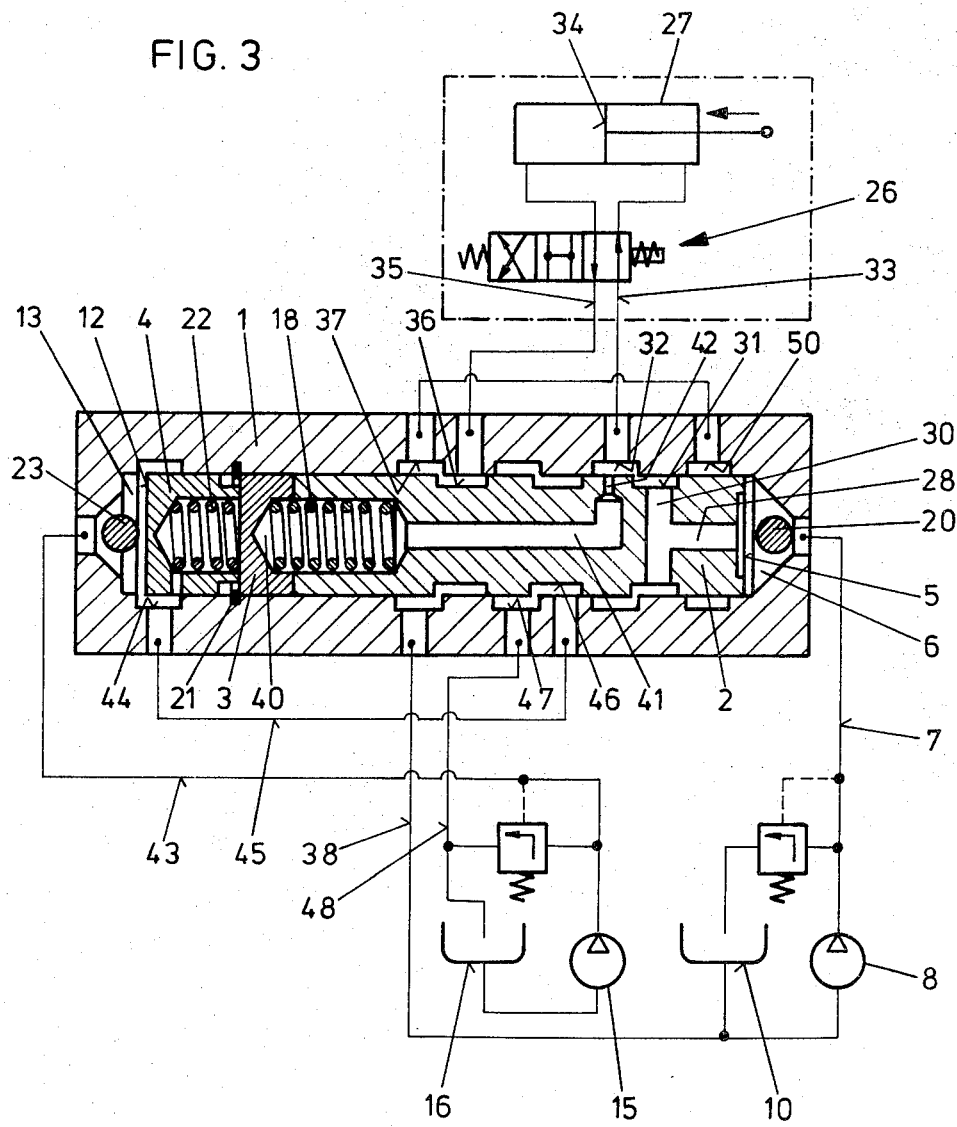
FIG. 3 is a section view similar to FIG. 1 but showing the transfer valve assembly in a normal vehicle travel position.

In FIG. 3, the transfer valve assembly is shown in a normal operating position for vehicle travel whereby the engine driven pump 8 feeds pressure fluid to the servomotor 27 through the control valve 2 in its shifted position as shown. The emergency steering pump 15 driven by the vehicle, recirculates fluid to its reservoir 16 and is therefore unloaded. The control valve 2 was shifted from the position shown in FIG. 1 by the fluid pressure from pump 8 acting on the face 5 against the opposing bias of spring 18. As a result, the control valve 2 is out of contact with the contact pin 20 so that the indicator 24 is extinguished indicating operational readiness. The support piston 3 against which the spring 18 reacts, abuts the stop ring 21. The engine driven pump is thus connected hydraulically by a longitudinal passage 28, a cross passage 30 and an annular groove 31 on the control valve 2 to an annular port 32 in the valve bore from which a line 33 extends to the control valve 26. The control valve 26 when deflected for example to the left as shown in FIG. 3, will conduct fluid under the operating pressure of pump 8 through the flow path described to the right-hand pressure chamber of the servomotor 27. The support piston 3 shifts to the left and fluid is displaced from the left chamber of the servomotor 27 for flow through a return flow path formed by a line 35, valve passage groove 36 on control valve 2, annular port 37 in the valve bore and a return line 38 to the reservoir 10. A fluid pressure storing spring chamber 40 enclosed by support piston 3 at the end of control valve 2 opposite the chamber 6, is also pressurized by the pump 8 because of the fluid communication thereto established by a bore 41 and a restricted passage 42 formed within the control valve 2. The emergency steering pump 15 driven for example by the rear vehicle wheels or the axial drive, delivers pressure fluid through line 43 to the chamber 13 to which the end face 12 of the connecting valve 4 is exposed. The connecting valve 4 is therefore shifted to the right as shown in FIG. 3 against the bias of spring 22 so that the associated indicator 25 is extinguished. An annular valve body port 44 controlled by the connecting valve 4 is therefore opened to conduct pressure fluid through conduit 45 to groove 46 of control valve 2 establishing a return flow path through port 47 and return line 48 to the reservoir 16 of the emergency steering pump 15. The pump 15 is therefore relieved.

Figure 4:
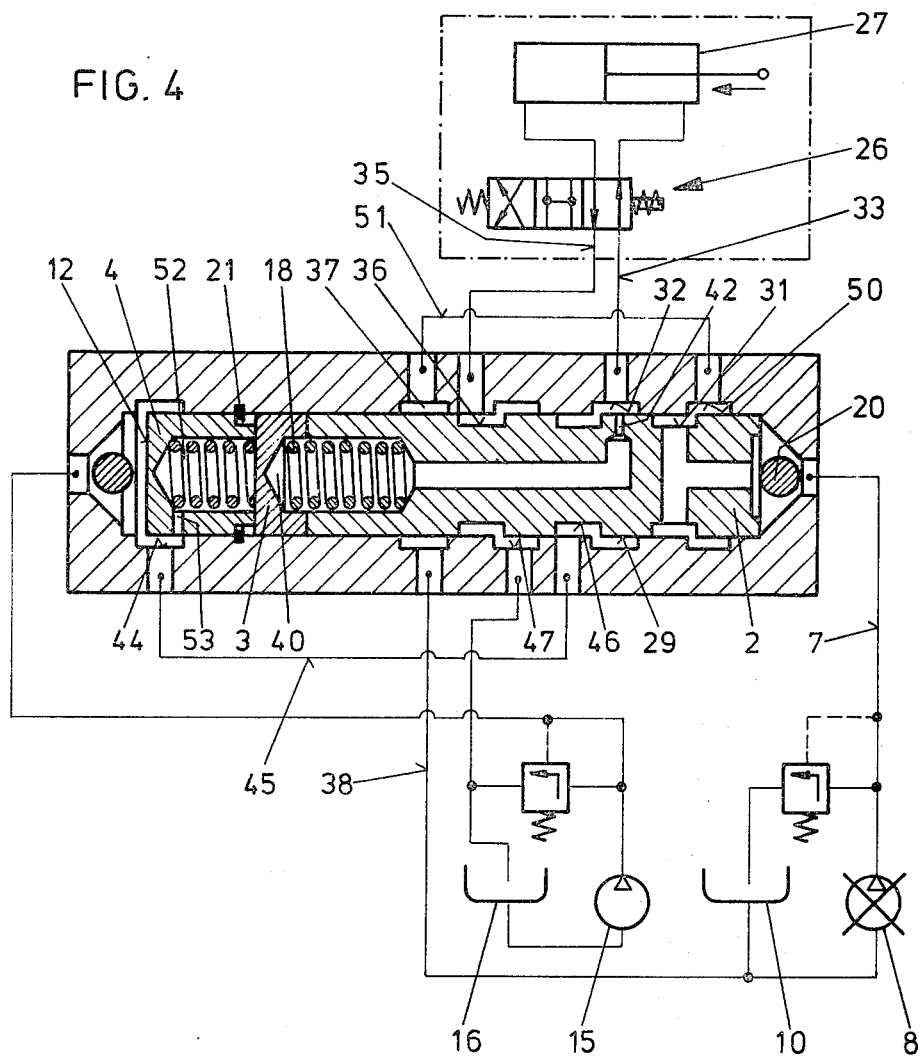
FIG. 4 is a section view similar to FIG. 1, but showing the transfer valve assembly in an emergency steering position after failure of the engine driven pump.

FIG. 4 shows the transfer valve assembly in the emergency operating position after failure of the engine driven pump because of a broken V-belt, for example. Because of the flow loss from pump 8, the spring 18 has shifted the control valve 2 to the right so that it makes contact with the contact pin 20. Thus the circuit for the indicator 24 is closed to signify malfunction of the fluid circuit 7, 8, 10. The valve passage 31 on valve 2 is now connected through port 50, conduit 51 and port 37 to the reservoir 10. The pump intake line 7 of pump 8 is therefore relieved. With the control valve 26 shifted to the left to effect a steering movement through servomotor 27 under the pressure fluid from the emergency steering pump 15, the valve 4 is shifted to its right-hand position abutting the stop ring 21 as shown in FIG. 4. The extension 9 of the valve 4 is projected through the stop ring 21 to engage the support piston 3 and shift it to the right to hold the control valve 2 in its right-hand position. The pressure fluid from the emergency steering pump is then supplied through a fully opened port 44 to the servomotor through the line 45, the piston groove 46, the port 32 and the line 33. A connecting bore 53 in connecting valve 4 leads into the spring chamber 32 of the connecting valve so that the pressure exerted on the face 12 by fluid from the emergency steering pump 15 will be opposed by pressure applied to piston 3 on its reverse side. Thus, during shift of the control valve 2 to the emergency steering position, the bias of spring 18 is augmented. Should the engine driven pump deliver fluid under a pressure less than operating value as a result of a slipping V-belt, for example, the resulting flow is exhausted through the secondary line 51 and the return line 38 to the reservoir 10. The line 35 receiving return fluid from the servomotor is connected by the piston groove 36 and the port 37 to the reservoir 16 of the emergency steering pump 15. The power steering mechanism 26–27 will therefore remain entirely functional.

Flow of fluid supplied by the engine driven pump 8 to the servomotor 27 during normal vehicle travel, is metered through orifice restriction 42 to the spring chamber 40 so that the pressure fluid stored in chamber 40 will enable spring 18 to shift the control valve 2 to the right in the event that fluid flow decreases, permitting takeover by the emergency steering pump 15. The width of the piston groove 31 on valve 2 is dimensioned relative to valve land 29 such that after closing of the passage from groove 31 to port 32, a passage from groove 31 to port 50 is established. Thus, no residual pressure remains in chamber 6 to impede the shifting of the control valve to the right.

Figure 5:
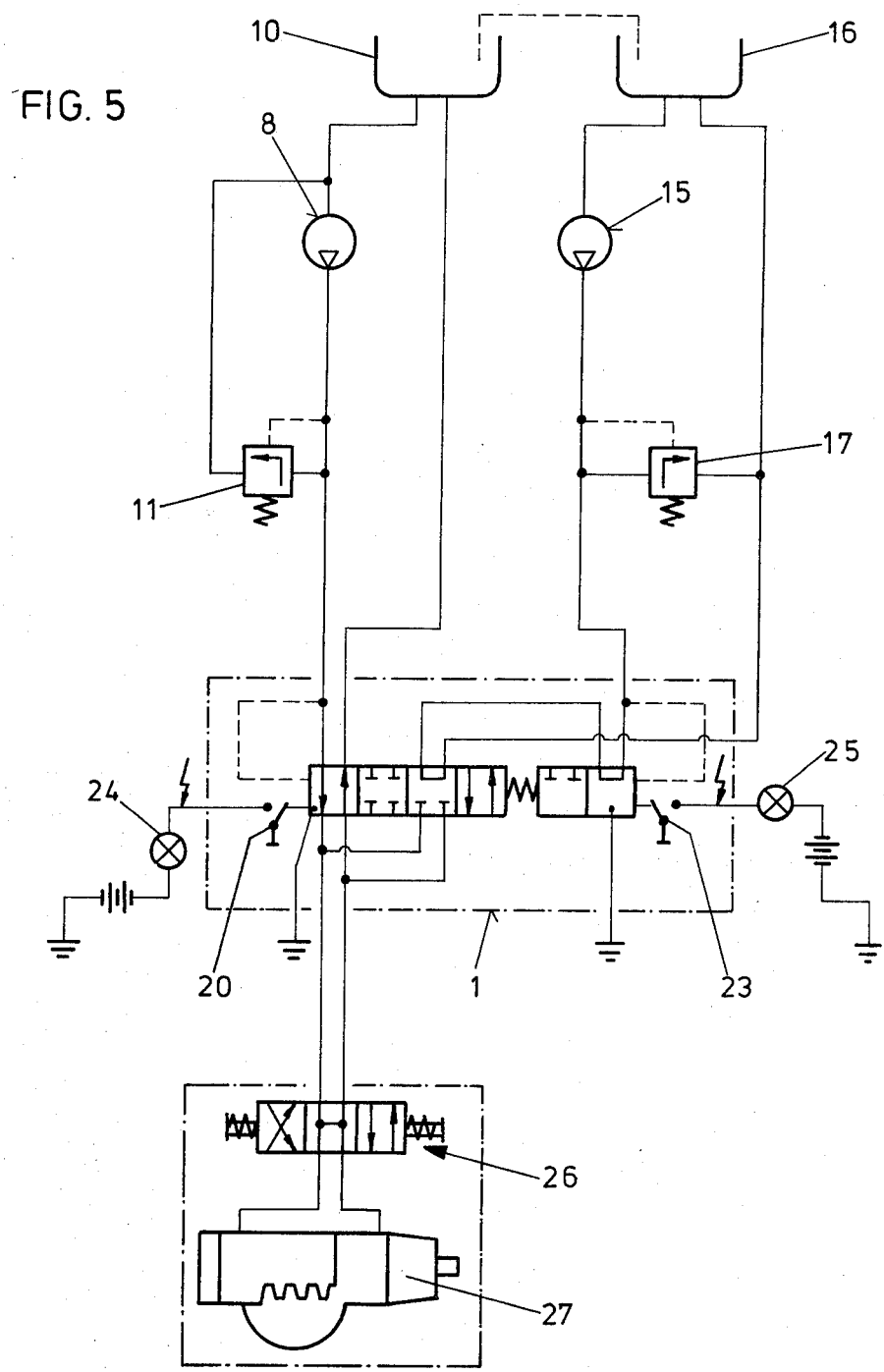
FIG. 5 is a schematic circuit diagram of the entire steering system.

The schematic circuit diagram of the entire steering system shown in FIG. 5, corresponds to the normal travel operation as described with respect to FIG. 3 except that the power steering mechanism 26–27 is shown in neutral position. The electrical circuits for the indicator lamps 24 and 25 are shown with the contact pins 20 and 23 symbolically depicted as ground establishing switches. The indicator lamps 24 and 25 are appropriately mounted on a board within view of the driver to signify pump inactivity when illuminated and pump operational readiness when extinguished.

Figure 6:
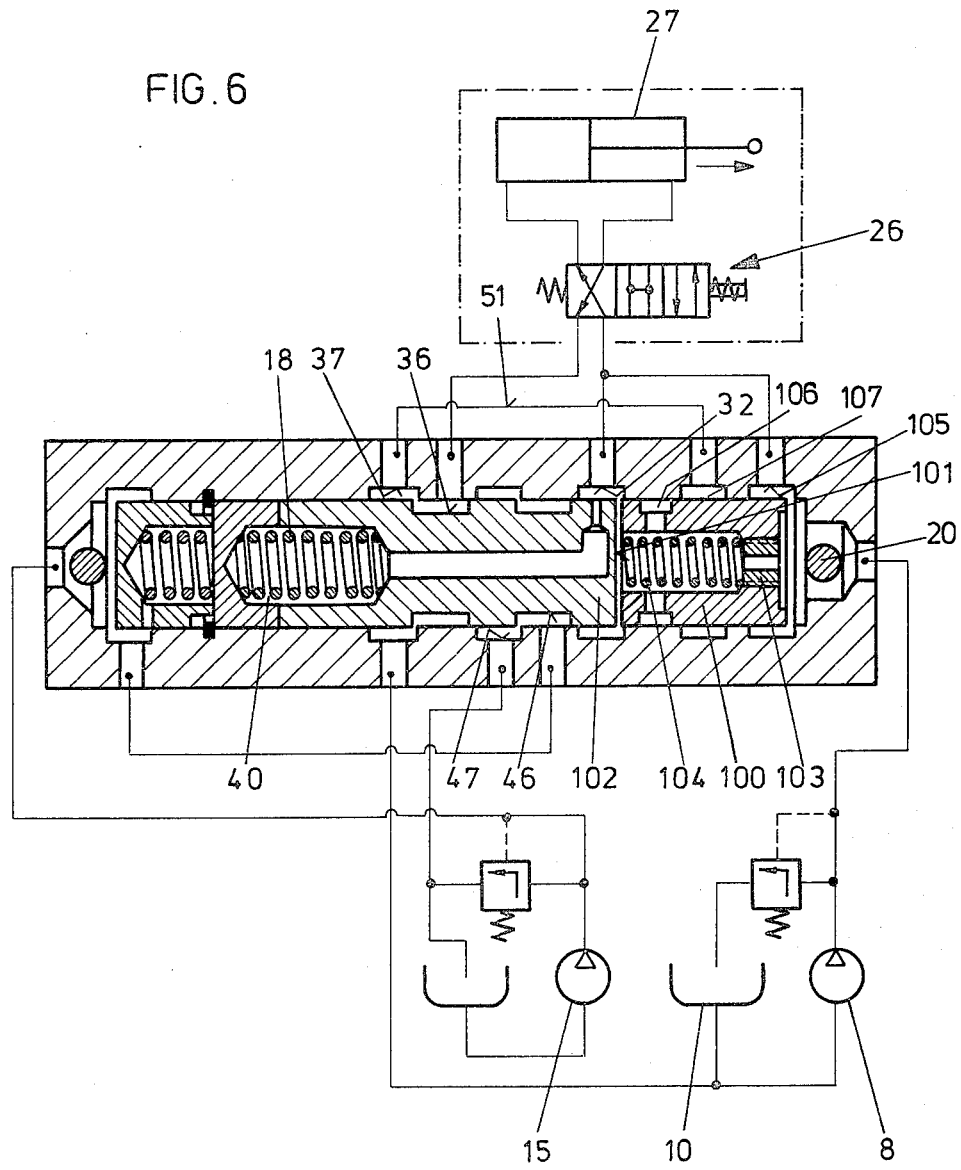
FIG. 6 is a section view and associated fluid circuit showing another embodiment of the transfer valve assembly in the normal position.

Another embodiment of the transfer valve assembly is shown in the normal operative position for vehicle travel in FIG. 6, with the control valve 26 shifted out of the neutral position to the right so that pressure fluid may flow into the left pressure chamber of the servomotor 27. The transfer valve assembly shown in FIG. 6 differs from the one previously described in that the control valve is replaced by two piston valves 100 and 102. The right hand piston valve 100 functions to enable or disable the engine driven pump 8 at a predetermined volumetric outflow rate of the fluid therefrom. The piston valve 100 is provided with a flow restricting orifice insert 103, the outlet cross section of which is adjusted for the minimum flow of fluid required for steering operation. An additional spring 104 abutting the face 101 of the piston valve 102 urges the piston valve 100 against the contact pin 20. As a result of full fluid flow from pump 8, the pressure exerted on the piston valve 100 shifts it so far to the left that an unobstructed fluid flow path to the left hand chamber of the servomotor 27 is established through port 105 and the control valve 26. The volumetric flow of fluid passing through the orifice insert 103 pressurizes face 101 and shifts the piston valve 102 and piston 3 to the left against the stop ring 21 to establish another parallel flow path to the left pressure chamber of the servomotor 27 through the port 32. The fluid displaced from the right hand pressure chamber of the servomotor is exhausted through the piston groove 36 and port 37 into the reservoir 10. Since the permissible maximum pressure of the pump 8 is somewhat above the maximum pressure of the emergency steering pump 15, the pressure going to the piston valve 100 predominates as a result of which a passage from the piston groove 46 to the port 47 is established and the emergency steering pump is unloaded, as described in connection with FIG. 3.

Figure 7:
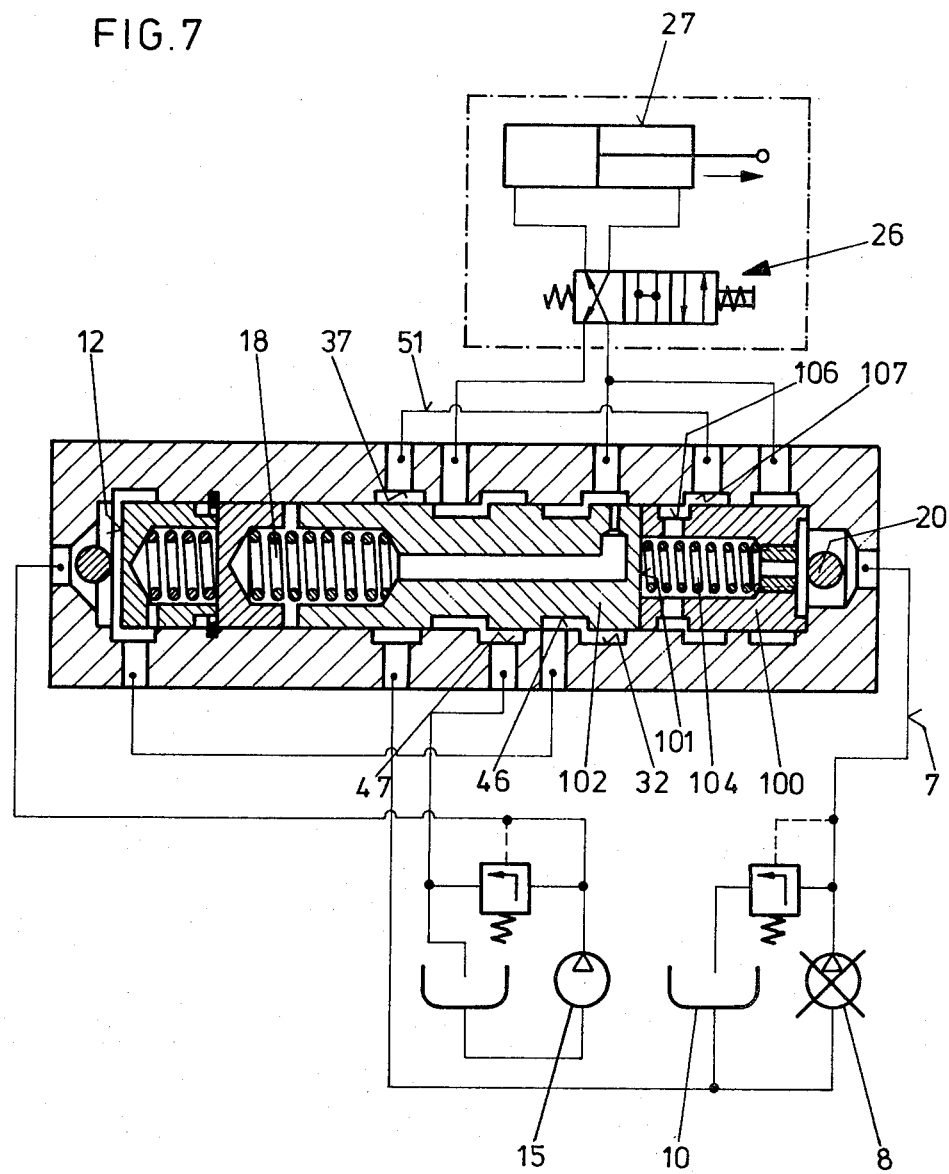
FIG. 7 is a section view similar to that of FIG. 6 showing the transfer valve assembly in the emergency steering position after failure of the engine driven pump.

The emergency steering position for the transfer valve assembly of FIG. 6 is shown in FIG. 7 corresponding to failure or partial failure of the engine driven pump 8. With the decrease in fluid flow from pump 8, both faces 5 and 101 become pressure-balanced so that the spring 104 displaces the piston valve 100 to the right hand position against the contact pin 20. As a result, piston groove 106 is in communication with port 107 so that the pump 8 is connected through the orifice insert 103, the secondary line 51 and the port 37 to its reservoir 10. Any residual pressure in the line 7 persisting because of only partial failure of the pump 8, thus collapses and the pump is completely unloaded. As a consequence, the piston valve 102 is also shifted to the right by the spring 18 as a result of which the piston groove 36 communicates with the port 32. The servomotor 27 is therefore supplied with fluid from the emergency steering pump 15 as hereinbefore described with respect to FIG. 4. In case of overtravel between the port 47 and the passage groove 46 on the piston valve 102, the pressure may briefly build up on the face 12 to assist the pump changeover action of the spring 18.

What is claimed is:

1. In combination with a power steering system having a servomotor (27), a primary pump (8) and an auxiliary pump (15), a transfer valve assembly displaceable between an inactive condition and two operating conditions for respectively establishing separate flow paths between the servomotor and the pumps, said transfer valve assembly comprising a valve body (1), a control valve (2 or 100-102) displaceably mounted within the valve body, a piston (3) engageable by the control valve within the valve body, stop means (21) engageable with the piston for limiting movement thereof by the control valve, a connecting valve (4) engageable with the piston within the valve body, spring means (22) engageable with the connecting valve and the piston for biasing thereof to positions corresponding to the inactive condition of the transfer valve assembly, first fluid pressure actuating means (5-6) connected to said primary pump for displacement of the control valve tending to establish one of the two operating conditions of the transfer valve assembly, second fluid pressure actuating means (12-13) connected to the auxiliary pump for displacement of the connecting valve tending to establish the other of the two operating conditions, and flow rate responsive control means (40-41-42) operatively connected to the primary pump through the control valve for influencing selection of one of the two operating conditions established by the control and connecting valves as a function of the flow rate of fluid from the primary pump to the servomotor.

2. The combination of claim 1 wherein said flow rate responsive control means comprises a pressure fluid storing chamber (40) within the control valve, and flow restricting passage means (42) connecting the chamber to one of the separate flow paths between the primary pump and the servomotor.

3. The combination of claim 2 wherein said connecting valve includes an extension (9) projected through the stop means into engagement with the piston by displacement of the connecting valve.

4. The combination of claim 1, 2 or 3 wherein said pumps have separate reservoirs, and a common exhaust line (35) extending from the servomotor alternatively connected to said separate reservoirs by the control valve in the two operating conditions of the transfer valve assembly.

5. The combination of claim 4 wherein displacement of the control valve by the first pressure actuating means is limited by the piston abutting the stop means to establish said one of the operating conditions while the connecting valve is simultaneously held in abutment with the piston through the control valve by the second fluid pressure actuating means.

6. The combination of claim 5 wherein the control valve connects the common exhaust line (35) from the servomotor to one of the reservoirs (16) associated with the auxiliary pump in the inactive condition of the transfer valve assembly and a separate exhaust line (38) from the other of the reservoirs (10) associated with the primary pump is connected to the primary pump.

7. The combination of claim 1, wherein said control valve includes piston valve means (100) for establishing a flow path in parallel with one of the flow paths to the servomotor, said flow rate responsive control means including orifice means (103) mounted by said piston valve means for establishing a restrictive flow passage between the primary pump and the first fluid pressure actuating means and additional spring means (104) biasing the piston valve means to a position unloading the primary pump in response to a decrease in outflow of fluid therefrom.

* * * * *